Jan. 10, 1967                E. J. MORIARITY                3,297,370
              FILTER CLEANER MECHANISM FOR PNEUMATIC
                    MATERIAL CONVEYING SYSTEM
Filed Dec. 31, 1964                                    2 Sheets-Sheet 1

TO EJECTOR PUMP 17

TO AIR MOTOR 19

INVENTOR.
EDWARD J. MORIARITY
BY
ATTORNEY

Jan. 10, 1967   E. J. MORIARITY   3,297,370
FILTER CLEANER MECHANISM FOR PNEUMATIC
MATERIAL CONVEYING SYSTEM
Filed Dec. 31, 1964   2 Sheets-Sheet 2

INVENTOR.
EDWARD J. MORIARITY
BY
ATTORNEY

United States Patent Office 3,297,370
Patented Jan. 10, 1967

3,297,370
FILTER CLEANER MECHANISM FOR PNEUMATIC MATERIAL CONVEYING SYSTEM
Edward John Moriarity, Cincinnati, Ohio, assignor to Vac-U-Max, Belleville, N.J., a corporation of New Jersey
Filed Dec. 31, 1964, Ser. No. 422,660
8 Claims. (Cl. 302—59)

The present invention relates to the pneumatic conveying of fluent particles of material, and, more particularly, to cleaning the filter of a system for conveying such fluent material wherein pneumatic pressure or suction is created for propelling or entraining the material and conveying the same from one place to another.

Such systems generally include a storage receptacle or bin for the fluent material; a closed receptacle into which the material is conveyed and then discharged therefrom for measuring, batch feeding or other purposes which has an inlet for the material and an air outlet adjacent the upper end thereof; a filter such as porous fabric or the like disposed between the inlet and the outlet for allowing air to pass freely therethrough but for preventing fine particles of the material from reaching the outlet; and air displacing means such as a pump for the creating of pressure or suction to convey the material.

One of the inherent difficulties of such systems is that fine particles of the material blind or clog the pores of the filter at the high pressure side thereof and build up a layer of material which eventually reduces air flow through the filter to a value at which the system will function inefficiently or not at all.

While attempts have been made to provide apparatus which periodically cleans the filter, such apparatus cannot be used in both pneumatic pressure and suction systems and in conjunction with receptacles of all volumetric capacities through which air is passed over a wide range of flow rates and pressure values.

Accordingly, an object of the present invention is to provide a fluent material conveying system equipped with apparatus for cleaning the filter thereof.

Another object is to provide such a system wherein mechanism shakes the filter to remove particles therefrom.

Another object is to provide such a system which includes a control arrangement for rendering the mechanism effective upon rendering the air flow producing means ineffective.

Another object is to provide such a control arrangement wherein the mechanism remains effective for a predetermined duration of time.

A further object is to provide such a system which is simple and economical in construction and is effective and reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing a system of the type indicated herein which includes mechanism for shaking the filter to loosen material adhering thereto, motor means for driving the mechanism, a source of energy for operating the motor means, a pump for producing air flow, a source of energy for operating the pump, and a control arrangement for alternately supplying energy to the motor means and to the pump, whereby the filter is cleaned while the pump is shut down.

A preferred embodiment of the invention has been chosen for purposes of illustration and description, and is shown in the accompanying drawings, forming a part of the specification, wherein.

Figure 1:
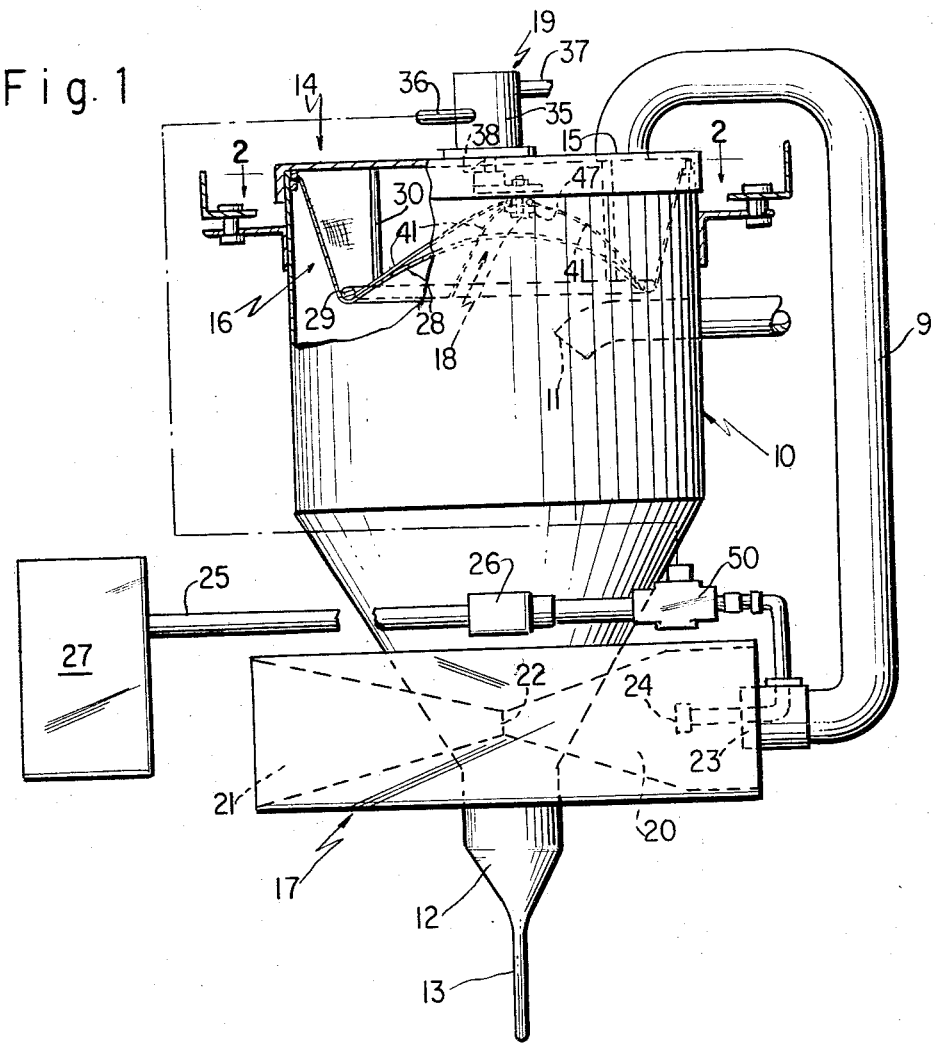
FIG. 1 is a schematic longitudinal section view of the receptacle for receiving the conveyed material equipped with the elements of the system in accordance with the present invention.
Figure 2:
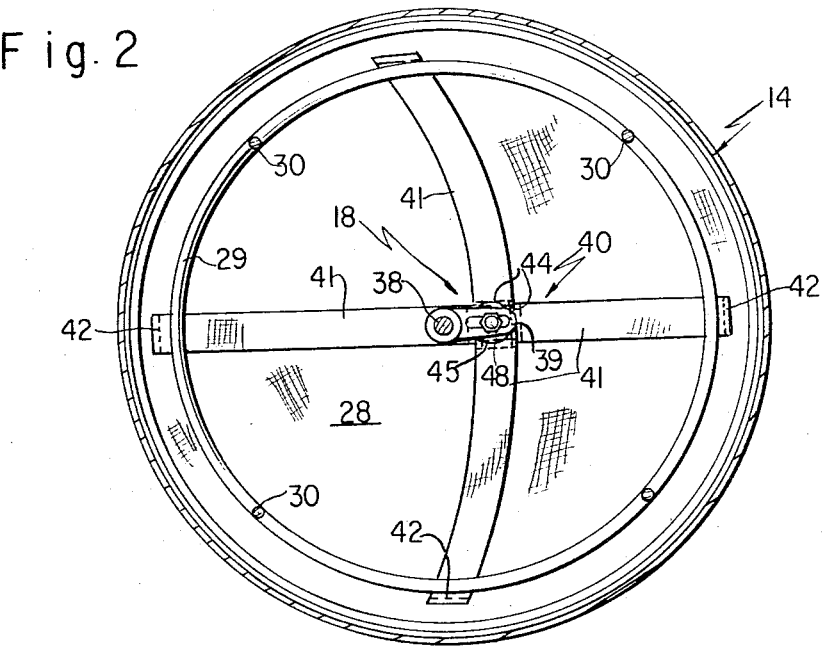
FIG. 2 is a sectional view taken along the line 2—2 on FIG. 1 illustrating the filter and the mechanism for shaking the filter.

Referring now to FIGS. 1 and 2 of the drawings in detail, a system for conveying fluent material is shown which essentially comprises a closed receptacle 10 such as a hopper having an inlet 11 for receiving a batch of fluent pulverized material, an outlet 12 controlled by a valve or closure 13 for discharging the material from the receptacle by gravity flow, and a cover 14 provided with an air outlet 15; a filter 16 in the receptacle between the inlet 11 and the air outlet 15 for preventing the material from entering the air outlet; air flow producing apparatus 17; mechanism 18 including a motor 19 for shaking the filter 16 to loosen and remove material adhering thereto; and a control system for rendering the apparatus 17 effective and ineffective and for rendering the motor 19 effective while the apparatus 17 is ineffective as will be described hereinafter.

The system illustrated herein by way of example is completely air operated and controlled to avoid explosion hazards, and is of the type wherein suction is created to produce air flow from the inlet 11 to the air outlet 15.

The apparatus 17 shown herein thus is a compressed air operated ejector pump which comprises a flared inlet section 20 provided with an intake 23 connected to the air outlet 15 by a pipe 9, a flared outlet section 21 in communication with the atmosphere, a throat 22 between the inlet and outlet sections, a nozzle 24 for directing compressed air into the inlet section whereby air is entrained from the receptacle by way of the outlet 15, and a pipe 25 controlled by a master valve 26 for connecting the nozzle 24 to a source of compressed air 27.

The filter 16 is constructed of porous flexible fabric and is in the general shape of a bag having its periphery supported at the upper end of the receptacle 10 and having a bottom 28 held downwardly within the receptacle by a horizontal ring 29 suspended by vertical rods 30 secured to the underside of the cover 14, whereby the filter 16 is disposed between the inlet 11 and the air outlet 15 of the receptacle to prevent fluent material from entering the air outlet 15.

The mechanism 18 for shaking the filter 16 thus includes a motor 19 which is operated by air under pressure. The motor is mounted on the receptacle cover 14 at about the center thereof; and is of a conventional type which generally comprises a casing 35 having a chamber containing a rotor (not shown) and having an air inlet 36 and an air outlet 37, and a drive shaft 38 extending downwardly into the receptacle. In order to connect the motor for shaking the filter, the mechanism further comprises a crank arm or eccentric 39 secured at its inner end to the drive shaft 38 for rotation therewith, and a harness 40 secured to the filter and connected to the crank arm 39 as about to be described.

As best shown in FIG. 2, the harness 40 comprises a plurality of radially extending flexible straps 41 having their outer ends sewn to the bottom 28 of the filter 16 at 42 and having their inner or intersecting portions sewn together at 44; and a ring-like member such as a grommet 45 secured to the straps at the central portions and having a circular bore 46.

The harness 40 is connected to the crank arm 39 by rotatably mounting a bushing 47 on a bolt 48 secured to the outer end of the crank arm. The bushing 47 extends through the bore 46 and has a head 49 at its lower end for retaining the grommet 45 thereon. Thus, as the bushing revolves through a circular path, the straps are pulled back and forth to vigorously shake the filter.

Preferably, the bushing 47 is formed of a plastic resin such as Teflon which is tough and wear resistant and is self lubricating to minimize wear on the grommet.

The system so far described can be operated manually to render the pump and the motor selectively effective and ineffective as desired by opening and closing the master valve 26 and a valve (not shown) at the inlet of the air motor, whereby the filter shaking mechanism is operated.

However, in accordance with the present invention, the system is provided with a control arrangement for effecting automatic operation of the pump and the filter shaking mechanism as desired by a single control valve which may be operated manually or automatically as in the system disclosed in copending U.S. patent application Serial No. 268,892, filed March 29, 1963, now Patent No. 3,186,768, granted June 1, 1965, assigned to the assignee of this application.

Figure 3:
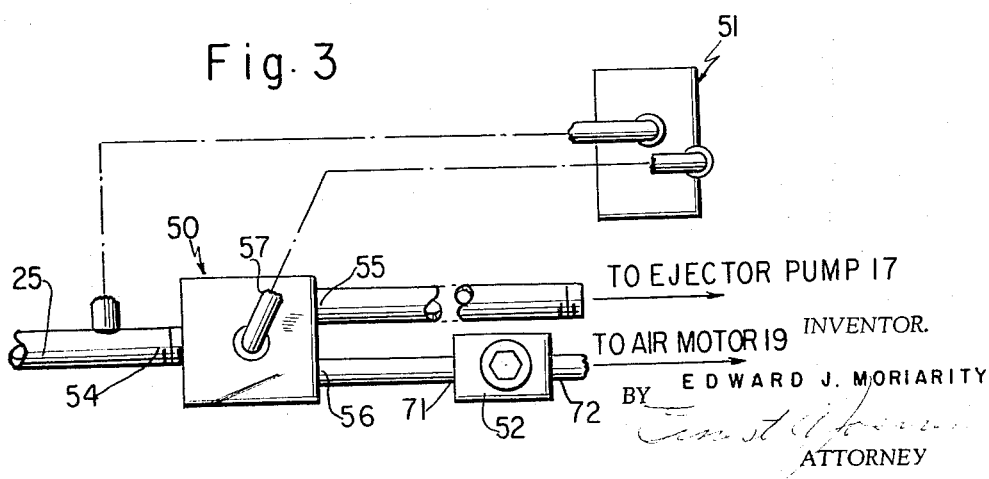
FIG. 3 is a schematic view of the elements and their connections for controlling the shaking mechanism.

As shown in FIGS. 1 and 3, such a control arrangement generally comprises an air pressure actuated valve 50 for alternately supplying air under pressure from the source to the pump and motor, a control valve 51 for supplying air under pressure from the source to the valve 50, and a timing valve 52 (FIGS. 3 and 5) connected between the valve 50 and the air inlet of the motor.

Figures 4, 5:
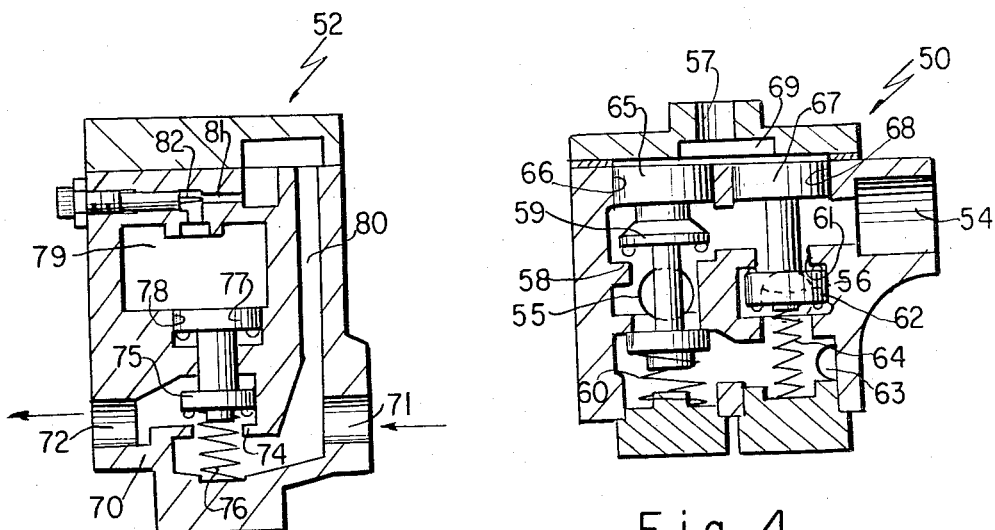
FIG. 4 is a schematic sectional view of a control valve for rendering the mechanism effective when the pump is rendered ineffective.
FIG. 5 is a schematic sectional view of a valve for rendering the mechanism ineffective after a predetermined period of time.

As shown in FIG. 4, the valve 50 is a four-way, inline air actuated valve of the type available from Ross Operating Valve Company, Detroit, Michigan. Such a valve essentially comprises a casing having an inlet 54 connected to the source 27 of air under pressure through the master valve 26, a first outlet 55 for supplying air to the pump, a second outlet 56 for supplying air to the motor and an inlet 57 for air under pressure supplied by the control valve 51 for actuating the valve 50 as described hereinafter; valve means structure in the casing including a first valve seat 58 between the inlet 54 and the first outlet 55, a first valve member 59 for the seat 58, a spring 60 arranged for normally holding the valve member 59 off its seat 58, a second valve seat 61 between the inlet 54 and the second outlet 56, a second valve member 62 for the seat 61 and a spring 64 arranged for normally holding the valve member 62 on its seat 61; a vent 63 to atmosphere; and actuating means structure in the casing including a first piston 65 in a bore 66 for moving the first valve member 59 onto its seat, a second piston 67 in a bore 68 for moving the second valve member 62 off its seat and a chamber 69 above the pistons 65 and 67 and the bores 66 and 68 provided with the inlet 57 whereby the pistons 65 and 67 are actuated simultaneously in response to air under pressure from the control valve 51 to render the pump 17 ineffective and the motor 19 effective and vice versa when the air is vented from the chamber 69.

The control valve 51 is of a conventional type which in one position supplies air to the inlet 57 and in another position shuts off air from the source 27 and vents the air in the chamber 69 of the valve 50.

As shown in FIG. 5, the timing valve 52 is an air actuated, inline, normally open, timed sequence of the type also available from Ross Operating Valve Company. Such a valve essentially comprises a casing having an inlet 71 connected to the outlet 56 of the valve 50 and an outlet 72 connected to the inlet 36 of the air motor 19; valve structure in the casing including a valve seat 74 between the inlet 71 and the outlet 72, a valve member 75 for the seat 74 and a spring 76 arranged to normally hold the valve member off its seat; and actuating structure in the casing including a piston 77 in a bore 78 for moving the valve member 75 onto its seat, a chamber 79 above the piston 77 and the bore 78, and a passageway 80 extending from the inlet 71 to the chamber 79 and provided with a metering orifice 81 for supplying air under pressure to actuate the piston 77 after air flow through the valve for several seconds. Preferably, an adjustable needle valve member 82 extends into the orifice 81 to vary the effective areas of the orifice so that the valve is closed between one and three seconds after the air motor has been in operation.

In operation, when the system is idle and the receptacle 10 is empty, the closure 13 is open, the master valve 26 and the control valve 51 are closed, the air supply section of the valve 50 for the ejector pump is open, the air supply section of the valve 50 for the air motor is closed, and the timing valve 52 is open. The master valve 26 is then opened to effect operation of the pump to cause the closure 13 to be closed by suction and fluent material to be drawn into the receptacle 10. When a predetermined amount of fluent material has been conveyed into the receptacle, the control valve 51 is opened either manually or automatically by the arrangement disclosed in application Serial No. 268,892, now Patent No. 3,186,768, whereby the valve 50 is actuated to close the air supply section thereof for the pump and render the pump ineffective and to open the air supply section thereof for the motor and render the motor effective to shake the filter. After the motor has been in operation for about two seconds, for example, the timing valve 52 is closed to render the motor ineffective.

As the suction in the receptacle decays due to the pump being rendered ineffective, the closure 13 opens to discharge the fluent material from the receptacle. Upon emptying of the receptacle or discharge of a predetermined amount of material from the receptacle, the control valve 51 is closed either manually or automatically by the arrangement disclosed in application Serial No. 268,892, now Patent No. 3,186,768, to vent the actuating head of the valves 50 and 52 whereby the valve 52 is opened and the valve 50 is restored to a condition to again render the pump 17 effective and to maintain the air motor 19 ineffective. Such operation completes one cycle of the system which is thereafter repeated.

While the present invention has been described in connection with an air operated and air controlled system, it will be understood that the system could be partially or entirely controlled by electrical components such as switches, relays and solenoids for opening and closing the valves at the desired moments, provided the electrical contacts of such components are sealed to prevent dust explosions or the fluent material handled is of such a nature so that it is not subject to dust explosions.

From the foregoing description, it will be seen that the present invention provides a filter cleaning arrangement for pneumatically operated fluent material conveying systems which arrangement is simple, practical, efficient and reliable, and can be installed in an economical manner on new and existing equipment.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. Filtering apparatus comprising a flexible filter bag for fine particles of material conveyed pneumatically, radially extending flexible straps having their outer ends secured to said bag and having their inner ends secured to each other substantially at the center of said bag, and a member secured to said straps at the inner ends thereof from within a bearing bore for the reception of an element driven to move said straps to effect shaking of said bag to loosen and remove material adhered to said bag.

2. Apparatus according to claim 1, including a motor having a drive shaft, a bushing extending through and retained in said bore, and means for eccentrically mounting said bushing on said shaft, whereby said motor effects movement of said straps to shake said bag.

3. Apparatus according to claim 1, wherein a pair of intersecting straps are secured at the intersection thereof, and said member is a grommet formed with said bore and secured to said straps at the intersection thereof.

4. Apparatus according to claim 3, including a motor having a drive shaft, a crank secured on said drive shaft for rotary movement therewith and a bushing rotatably mounted on said crank and extending through and being retained in said bore, whereby said motor effects movement of said straps to shake said bag.

5. In a system for conveying fluent material, the combination of a closed receptacle having an inlet and a closure controlled outlet for the material and having an air outlet in the top thereof, a flexible filter bag mounted in said receptacle at the top thereof and between said inlet and said air outlet for preventing the material from entering said air outlet, an ejector pump having its intake connected to said air outlet for causing air flow from said inlet to said air outlet and for coveying the material to said inlet, a source of air under pressure connected for operating said pump, first valve means for controlling the flow of air under pressure to render said pump effective and ineffective, an air motor mounted on said receptacle having a drive shaft within said receptacle facing said filter bag, a crank on said drive shaft, flexible straps secured to said filter bag and connected to said crank for movement therewith to effect movement of said filter bag and shake the same to loosen and remove therefrom material adhered to said filter bag, said air motor being connected for operation by air under pressure from said source, second valve means for controlling the flow of air under pressure to render said motor effective and ineffective, control means operated by air under pressure for operating said first and second valve means to alternately render said pump effective and said motor ineffective and render said motor effective and said pump ineffective, and a valve connected for controlling the flow of air under pressure from said source to said control means to effect operation of said control means.

6. In a system according to claim 5, including a timing valve between said second valve means outlet and said air motor inlet for rendering said motor ineffective after said motor has been effective for a predetermined period of time.

7. In a system according to claim 6, wherein said timing valve includes an air pressure operated control element for closing said timing valve and an orifice for delivery of air under pressure from the outlet of said second valve means to said control element at a predetermined rate to time the closing of said timing valve.

8. In a system according to claim 7, wherein said timing valve includes means for varying the effective area of said orifice to adjust the closing time of said timing valve.

References Cited by the Examiner

UNITED STATES PATENTS

| 1,153,751 | 9/1915 | Beth | 302—59 |
| 2,667,233 | 1/1954 | Vedder | 55—304 |
| 2,946,626 | 7/1960 | Atkinson et al. | 302—59 |
| 3,097,939 | 7/1963 | Schneider et al. | 55—304 |
| 3,169,038 | 2/1965 | Pendleton | 302—59 |

FOREIGN PATENTS 1,037,237  9/1958  Germany.

ANDRES H. NIELSEN, *Primary Examiner.*